UNITED STATES PATENT OFFICE.

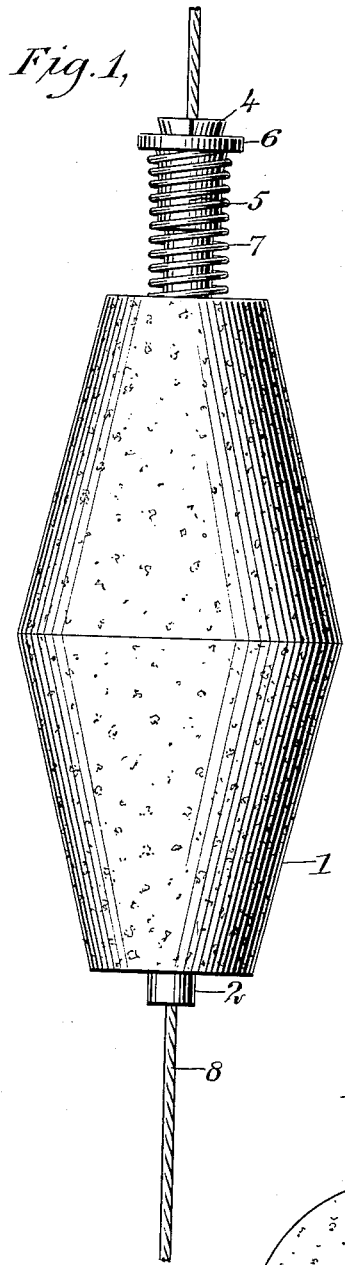
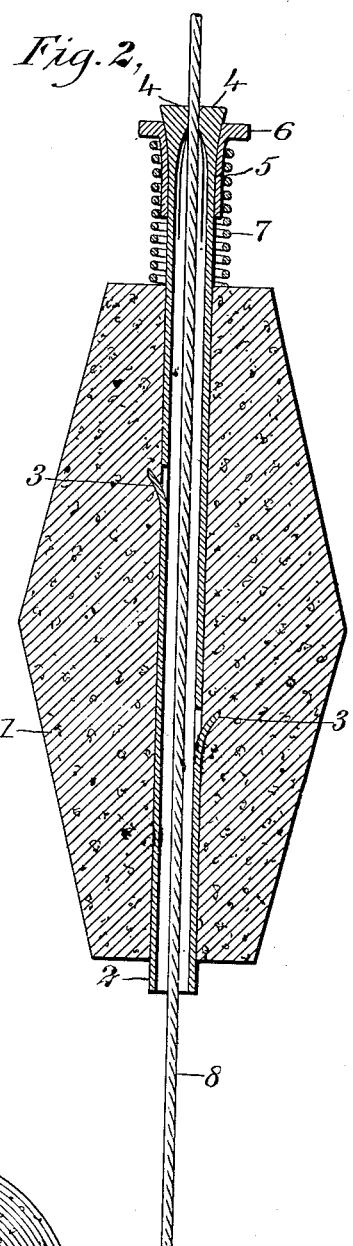
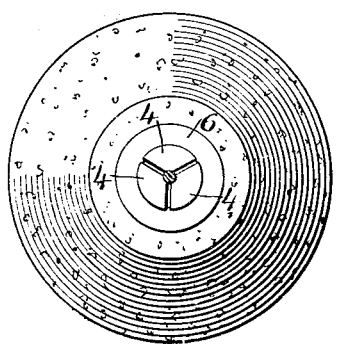

WILLIAM NICKERSON SIMMONS, OF PASS CHRISTIAN, MISSISSIPPI.

FISHING-FLOAT.

No. 862,853.  
Specification of Letters Patent.  
Patented Aug. 6, 1907.

Application filed December 5, 1906. Serial No. 346,389.

*To all whom it may concern:*

Be it known that I, WILLIAM NICKERSON SIMMONS, a citizen of the United States, and a resident of Pass Christian, in the county of Harrison and State of Mississippi, have invented a new and Improved Fishing-Float, of which the following is a full, clear, and exact description.

This invention relates to an improved float or barb for use on fishing lines, and the object thereof is to provide means by which the same may be securely held to the line at any desired point and whereby it may be easily and quickly adjusted thereon.

My improved float is very simple of construction, efficient in operation, and inexpensive to manufacture. With the above and other objects in view the invention comprises novel details of construction hereinafter described and pointed out in the claims.

Reference is to be had to the accompanying drawings forming a part of this specification, in which similar characters of reference indicate corresponding parts in all the figures, in which Figure 1 is a side elevation of a fishing float constructed in accordance with my invention; Fig. 2 is a vertical section through the same; and Fig. 3 is a plan view thereof.

The main body portion 1 of my improved float may be of any size, shape and material desired, as this portion constitutes no essential part of my invention. Extending through the body portion and longitudinally thereof is a tube 2 secured to the body portion in any suitable manner, but as shown I hold it in place by tongues 3, extending outwardly from the wall of the tube and engaging the inner surface of the body. The upper end of the tube is split down a short distance, as clearly indicated in Figs. 2 and 3, and the walls of the tube are thickened so that the outer diameter of the tube at this point is slightly greater than at any other point in the length of the tube, while the inner diameter is of substantially the same size as the fishing line in connection with which the float is employed. The slits in the end of the tube separate it at this point into a plurality of fingers or clamping members 4, and these when free slightly diverge so that the line may freely pass therebetween. Surrounding the tube at this end is a short sleeve 5, closely fitting the outer surface of the tube but small enough so that it cannot slip off the slightly enlarged end of the fingers or clamping members 4. This sleeve carries a flange 6 at its outer end, and between this flange and the end of the body portion is a coil spring 7. The spring normally forces the sleeve 5 toward the ends of the clamping members, and as the inner diameter of the sleeve is less than the outer diameter of the clamping members at their outer ends and the walls of both are greatly tapered, it is evident that the forcing outward of the sleeve 5 results in the forcing inward of the ends of the clamping members 4. The fishing line 8 passes through the tube and between the ends of the clamping members 4, and as they are held together by the sleeve 5, it is evident that the float is thus securely held upon the line at any point desired.

When it is desired to change the location of the float, all that is necessary is to press downward on the sleeve 5 against the action of the spring and the clamping members 4 then spread apart to permit of the free passage of the line.

In my improved fishing float above described, there are no separable parts which have to be removed before the position of the float can be changed, and it is unnecessary to tie any knots or otherwise bend or kink the line.

The clamp is so simple in construction that it is practically impossible for it to get out of order, and even if it should, the clamp is on the outside where it may be readily inspected and any defect easily remedied.

It is evident that many changes may be made in my improved device as the specific form above described constitutes merely one embodiment thereof.

Having thus described my invention, I claim as new and desire to secure by Letters Patent:

1. A fishing float, comprising a body portion having a tube extending therethrough, said tube being provided with a plurality of slits adjacent one end and the wall of said tube being of increased thickness adjacent said slits, a sleeve surrounding said tube adjacent said slits and longitudinally movable, and a coil spring surrounding said tube and said sleeve and adapted to move the tube longitudinally to press together the portions of the tube adjacent the slits to grip a line passing through said tube.

2. A fishing float, comprising a main body portion, a tube extending longitudinally therethrough, the end of said tube being adapted to engage with a fishing line, a sleeve surrounding said tube and adapted to hold the tube in engagement with the line, and a coil spring surrounding said tube and normally holding the parts in their clamping position.

3. A fishing float, comprising a body portion, fingers or clamping members extending upward from one end thereof and adapted to engage with a fishing line, the outer circumference of said fingers being greater at the end than at a point adjacent the float, a sleeve surrounding said fingers, and resilient means normally holding said sleeve in engagement with the enlarged ends of the fingers.

4. A fishing float, comprising a body portion having a passage therethrough, fingers secured to said body portion and surrounding the passage, the outer ends of said fingers being substantially larger in diameter than the part adjacent the body portion, a sleeve surrounding said fingers, a flange on said sleeve, and a coil spring surrounding said sleeve and fingers and normally forcing the sleeve away from the body portion and in engagement with the enlarged ends of the fingers, whereby the latter are held in engagement with a fishing line.

In testimony whereof I have signed my name to this specification in the presence of two subscribing witnesses.

WILLIAM NICKERSON SIMMONS.

Witnesses:
LEWIS H. CHAMPLIN,
S. R. CHAMPLIN.